(12) United States Patent
Schauer (10) Patent No.: US 10,564,609 B2
(45) Date of Patent: Feb. 18, 2020

(54) CONTROLLER FOR TREATMENT OF SEMICONDUCTOR PROCESSING EQUIPMENT EFFLUENT

(71) Applicant: Applied Materials, Inc., Santa Clara, CA (US)

(72) Inventor: Ronald Vern Schauer, Gilroy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 287 days.

(21) Appl. No.: 14/829,659

(22) Filed: Aug. 19, 2015

(65) Prior Publication Data

US 2016/0077508 A1  Mar. 17, 2016

Related U.S. Application Data (60) Provisional application No. 62/049,658, filed on Sep. 12, 2014.

(51) Int. Cl.
G05B 9/02 (2006.01)

(52) U.S. Cl.
CPC ..................... *G05B 9/02* (2013.01)

(58) Field of Classification Search
CPC .................. G05B 9/02; H05H 1/46
USPC ........................................... 700/99
See application file for complete search history.

(56) References Cited

U.S. PATENT DOCUMENTS

| | | | |
|---|---|---|---|
| 6,010,966 A | 1/2000 | Ionov | |
| 6,080,529 A | 6/2000 | Ye et al. | |
| 6,277,745 B1 | 8/2001 | Liu et al. | |
| 6,491,884 B1* | 12/2002 | Faller | B01D 53/02 423/210 |
| 2002/0066535 A1* | 6/2002 | Brown | B01D 53/32 156/345.29 |
| 2008/0081130 A1 | 4/2008 | Farnia et al. | |
| 2008/0102011 A1* | 5/2008 | Moalem | B01D 53/68 423/240 R |
| 2010/0071548 A1 | 3/2010 | Smith | |
| 2010/0075494 A1 | 3/2010 | Chung et al. | |
| 2010/0198550 A1* | 8/2010 | Schauer | C23C 14/505 702/145 |
| 2010/0206847 A1* | 8/2010 | Chen | H01J 37/32357 216/67 |

(Continued)

FOREIGN PATENT DOCUMENTS

| | | |
|---|---|---|
| CN | 101229476 A | 7/2008 |
| CN | 102358851 A | 2/2012 |

(Continued)

OTHER PUBLICATIONS

Aymen Amine Assadi, Jordi Palau, Abdelkrim Bouzaza, Josep Penya-Roja, Vicente Martinez-Soriac, et al. Abatement of 3-methylbutanal and trimethylamine with combined plasma and photocatalysis in a continuous planar reactor. Journal of Photochemistry and Photobiology A: Chemistry, Elsevier, Jul. 18, 2014, 282, pp. 1-8.*

(Continued)

*Primary Examiner* — Robert E Fennema
*Assistant Examiner* — Christopher W Carter
(74) *Attorney, Agent, or Firm* — Patterson + Sheridan, LLP (57) ABSTRACT

Embodiments disclosed herein include a controller for a treatment system for lessening the hazard of effluents produced in a processing system.

20 Claims, 4 Drawing Sheets

(56) References Cited

U.S. PATENT DOCUMENTS

2011/0135552 A1 6/2011 Dickinson et al.
2013/0284724 A1 10/2013 Cox et al.

FOREIGN PATENT DOCUMENTS

| CN | 102640255 A | 8/2012 |
|---|---|---|
| CN | 102741975 A | 10/2012 |
| CN | 103316561 A | 9/2013 |
| CN | 103585863 A | 2/2014 |
| CN | 103764261 A | 4/2014 |
| JP | 2010251710 A | 11/2010 |
| TW | 328676 B | 3/1998 |
| TW | 481863 | 4/2002 |
| WO | WO-2007126461 A2 | 11/2007 |

OTHER PUBLICATIONS

PCT international search report and written opinion of PCT/US2015/014096 dated May 29, 2015.
International Seach Report and Written Opinion for PCT/US2015/045473 dated Nov. 20, 2015.
Office Action from Chinese Patent Application No. 201580044209.0 dated Oct. 12, 2018.
Office Action for Taiwan Patent Application No. 104129169 dated Feb. 22, 2019.
Office Action for Chinese Patent Application No. 201580044209.0 dated Jul. 10, 2019.
Office Action for Japanese Patent Application No. 2017-514315 dated Aug. 13, 2019.

\* cited by examiner

CONTROLLER FOR TREATMENT OF SEMICONDUCTOR PROCESSING EQUIPMENT EFFLUENT

CROSS-REFERENCE TO RELATED APPLICATIONS

This application claims benefit of U.S. Provisional Application Ser. No. 62/049,658, filed Sep. 12, 2014, of which is incorporated by reference in its entirety.

BACKGROUND

Field

Embodiments of the present disclosure generally relate to semiconductor processing equipment. More particularly, embodiments of the present disclosure relate to a controller for the treatment of compounds produced in semiconductor processes.

Description of the Related Art

The process gases used in semiconductor processing include many compounds which can be hazardous. The effluent from these processing facilities may contain thee hazardous compounds or other harmful byproducts which must be treated before disposal due to regulatory requirements and/or environmental and safety concerns. Among these compounds are perfluorocarbons (PFCs), which are used, for example, in etching processes. Therefore, modern processing equipment include treatment technology for the hazardous effluent generated therein.

An inductively coupled plasma (ICP) source, along with other reagents, has been used for the treatment of PFCs and other global warming gases. The plasma generated by the ICP plasma source dissociates these compounds, and the dissociated gases react to form less hazardous materials. However, in order to effectively treat the hazardous compounds to lesser hazardous constituents, the pre-treatment and abatement technology and methodology has become more complex. Current abatement technology have difficulty treating certain types of gases and particulate matter used and generated in deposition processes, such as insulating or conducting materials generated therefrom. As the treatment of the hazardous compounds become more complex, control over the treatment process has increased in complexity as well.

Controls for current treatment technology rely on commercially available programmable logic controllers (PLCs). However, PLCs have limited functionality and often can only control the treatment process along a very narrow and exact routine. At least some hardware adaptations and external logic is required and programming is typically limited to very simple logical structures, if "programmable" at all. Moreover, programming the PLCs to provide error reporting, system interface ports and data logging is essentially unknown in general industry and may in fact be infeasible (such as in relay logic implementations) due to the nature of current PLC designs.

Accordingly, there is needed in the art for an improved controller for operating treatment technology in the semiconductor processes.

SUMMARY

Embodiments disclosed herein include controller for treatment of semiconductor processing equipment effluent, along with a method for treating hazardous effluents produced by a semiconductor processing system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
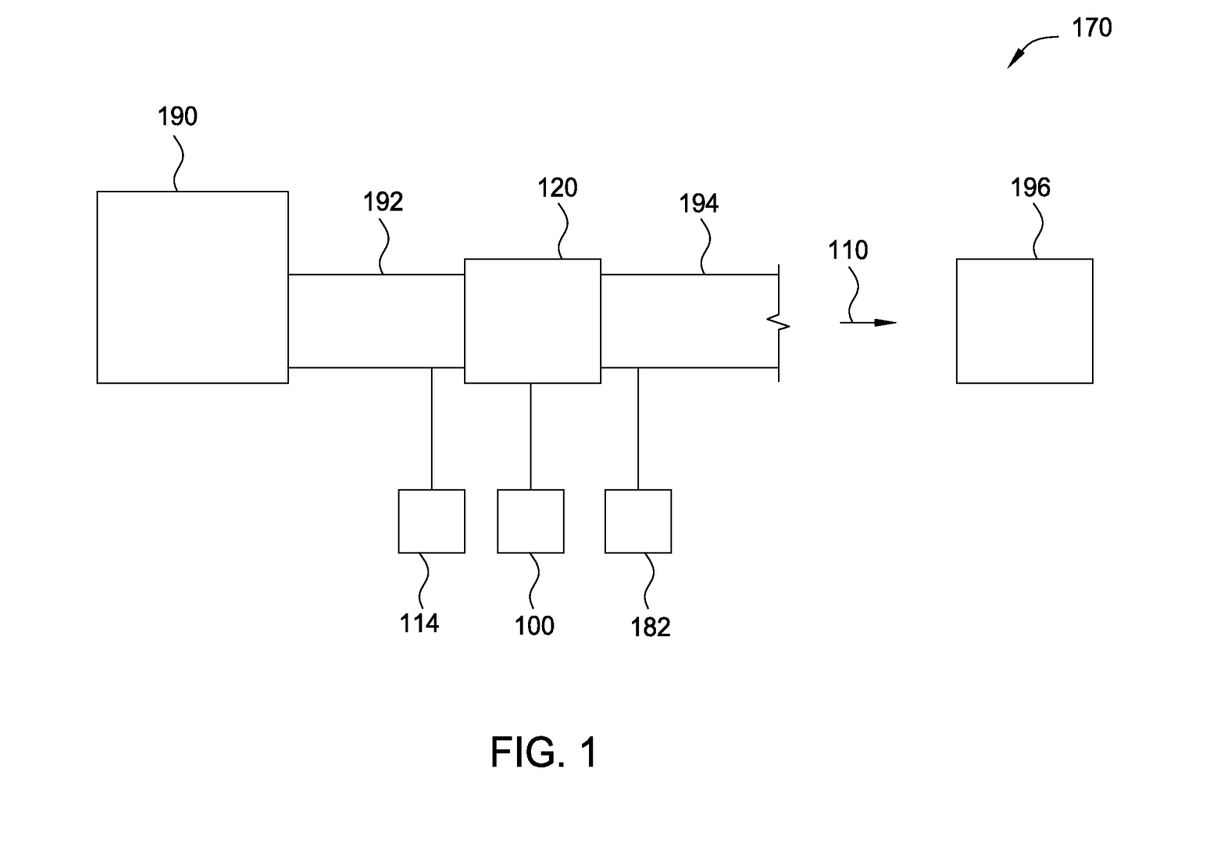
FIG. 1 is a schematic side view of a semiconductor processing system having an effluent pre-treatment system managed by a controller.

FIG. 1A is a schematic side view of a semiconductor processing system 170 having an effluent pre-treatment system 120 managed by a controller 100. The semiconductor processing system 170 includes a vacuum processing chamber 190. The vacuum processing chamber 190 is generally configured to perform at least one integrated circuit manufacturing process, such as a physical vapor deposition process, chemical vapor deposition process, a plasma-assisted (dry) etch process, a plasma treatment process, a substrate anneal process, a preclean process, an ion implant process, or other integrated circuit manufacturing process. The process performed in the vacuum processing chamber 190 may be plasma assisted. In one example, the process performed in the vacuum processing chamber 190 may be plasma deposition process for depositing a silicon-based material. In another example, the process performed in the vacuum processing chamber 190 may be a plasma-assisted etch process for forming features, such as trenches or vias, in a silicon based material.

The vacuum processing chamber 190 has a chamber exhaust coupled by a foreline 192 to the effluent pre-treatment system 120. The exhaust of the effluent pre-treatment system 120 is coupled by an exhaust conduit 194 to pumps and facility exhaust, schematically indicated by a single reference numeral 196 in FIG. 1. The pumps are generally utilized to evacuate the vacuum processing chamber 190, while the facility exhaust generally includes scrubbers or other exhaust cleaning apparatus for preparing the effluent of the vacuum processing chamber 190 to enter the atmosphere. A flow of the effluent is shown schematically by arrow 110.

The effluent pre-treatment system 120 is utilized to perform a pre-treatment or an abatement process on gases, compounds and/or other materials exiting the vacuum processing chamber 190 so that such gases and/or other materials may be converted into a more environmentally and/or process equipment friendly composition. Details of the effluent pre-treatment system 120 and the control thereof, are further described below in FIG. 2.

In some implementations, a treatment reagent source 114 is coupled to at least one of the foreline 192 and/or the effluent pre-treatment system 120. The treatment reagent source 114 provides a reagent into the effluent pre-treatment system 120 which may be energized to react with, or otherwise assist converting, the materials exiting the vacuum processing chamber 190 into a more environmentally and/or process equipment friendly composition.

Optionally, a pressure regulating module 182 may be coupled to at least one of the effluent pre-treatment system 120 and/or the exhaust conduit 194. The pressure regulating module 182 injects a pressure regulating gas, such as Ar, N, or other suitable gas, which allows the pressure within the effluent pre-treatment system 120 to be better controlled, and thereby provide more efficient abatement performance. For example, pressure regulating gas provided by the pressure regulating module 182 may be utilized to stabilize the flow rates and/or pressure of the effluent passing through the effluent pre-treatment system 120, thereby allowing more predictable process control for better control of the abatement results.

The effluent pre-treatment system 120 is disposed downstream of the vacuum processing chamber 190. The plasma generated in the effluent pre-treatment system 120 energizes and/or dissociates, partially or fully, the compounds within the effluent coming out of the vacuum processing chamber 190, converting the compounds in the effluent into more benign form.

Figure 2:
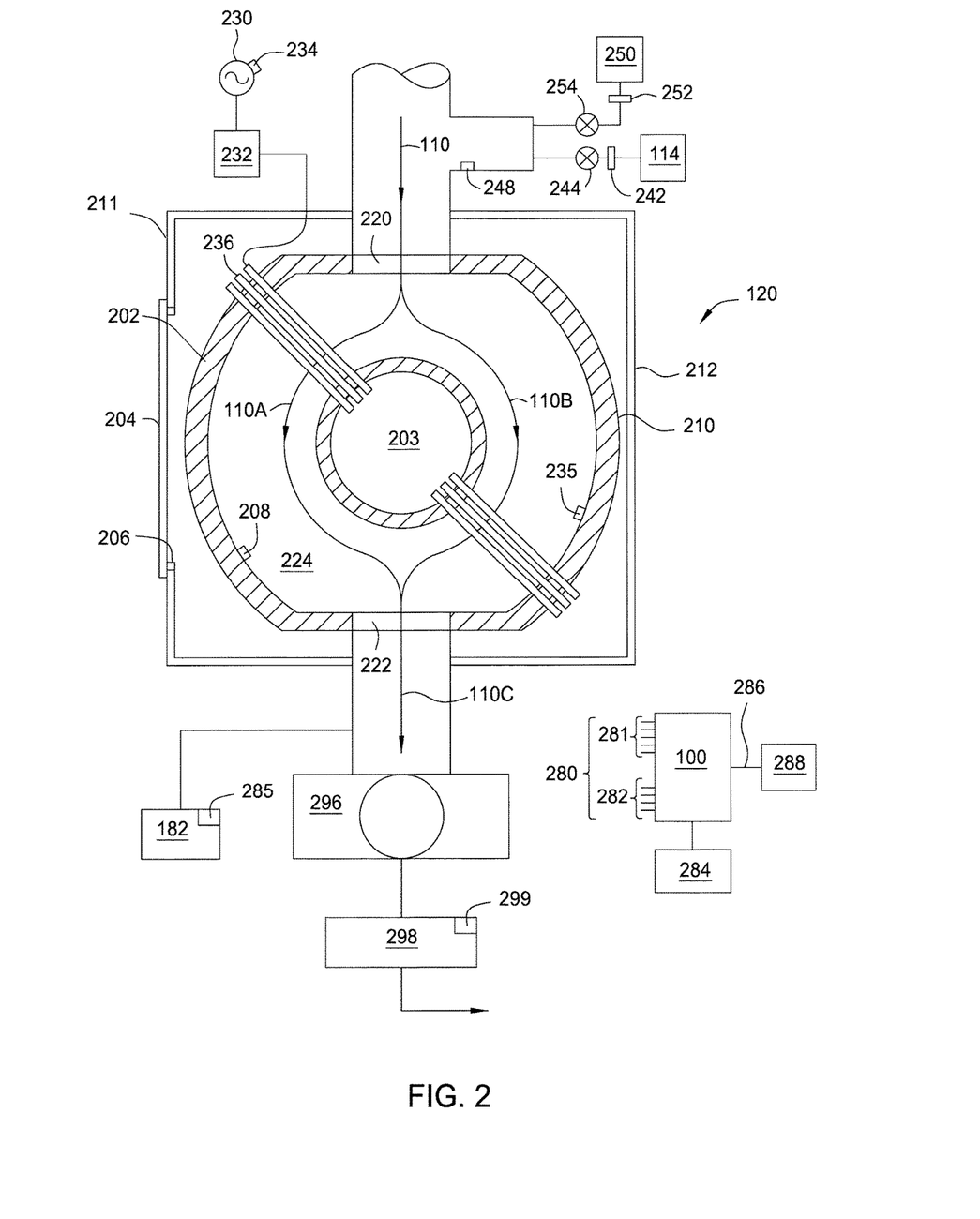
FIG. 2 is a schematic top view of the effluent pre-treatment system.

FIG. 2 is a schematic top view of the effluent pre-treatment system 120. The effluent pre-treatment system 120 is managed by the controller 100 and includes a plasma reactor 210. The effluent pre-treatment system 120 has a containment 211 with a door 204 which surrounds the plasma reactor 210. The containment 211 generally protects technicians from potential heat and electrical power hazards that may be generated by the effluent pre-treatment system 120. A sensor 206 may be disposed adjacent to the door 204. The sensor 206 is operable to provide a metric, such as a signal, indicative of the position of door 204. For example, the sensor 206 may be operable to provide a metric indicative of if the door 204 is in a closed and/or secured position.

The plasma reactor 210 has a body 202 and a first opening 220 from which the effluent may enter and second opening 222 from which the effluent may exit. The first opening 220 may be configured to couple to the foreline 192 and the second opening 222 may be configured to couple to the exhaust conduit 194. The body 202 may be circular, square, rectangular, or in other suitable shape. In one embodiment, the body 202 has a torroidal shape. A center portion 203 may be formed through the body 202. The center portion 203 may be circular, square, rectangular, or in other suitable shape. In one embodiment, the body 202 and center portion form a torus shape in an interior volume 224. In other embodiments, the body 202 does not include the center portion 203.

The body 202 may have a temperature sensor 208. The temperature sensor 208 may provide temperature information about the plasma reactor 210. For example, the plasma reactor 210 may be at a temperature wherein the treatment of the effluent may not be adequate or the temperature may damage process equipment. The thermal sensor may provide discrete temperature readings or signal a maximum or minimum threshold.

The plasma reactor 210 has an RF antenna 236. The RF antenna 236, such as one or more inductor coils, may be provided adjacent to the body 202 of the plasma reactor 210. An RF generator 230 may power the RF antenna 236 through a match circuit 232 to inductively couple energy, such as RF energy, to the effluent gas to maintain a plasma formed from the effluent gas in the plasma reactor 210 of the effluent pre-treatment system 120. An RF sensor 235 may monitor or measure the RF from the RF antenna 236. The RF sensor may provide feedback to the controller 100. Additionally a generator sensor 234 may be coupled to the RF generator 230. The generator sensor 234 may include or be a relay for controlling the flow of energy from the RF generator 230 to the RF antenna 236. The generator sensor 234 may also interface with the RF generator 230 and monitor information indicative of the state of the generator. The operation of the RF generator 230 may be controlled independently and/or through the generator sensor 234 by the controller 100, that also controls the operation of other components in the effluent pre-treatment system 120.

The effluent, such as the by-products exiting the vacuum processing chamber 190 or in the example where the effluent pre-treatment system 120 is a remote plasma source, as precursor and/or carrier gases for generating a remote plasma, may have a flow shown by arrow 110 and enter the plasma reactor 210 through the first opening 220. The by-products in the effluent may include silicon, tungsten, titanium, or aluminum containing materials. Examples of silicon-containing materials present in the effluent that may be treated using the effluent pre-treatment system 120 disclosed herein include, for example, silicon oxide (SiO), silicon dioxide ($SiO_2$), silane ($SiH_4$), disilane, silicon tetrachloride ($SiCl_4$), silicon nitride ($SiN_x$), dichlorosilane ($SiH_2Cl_2$), hexachlorodisilane ($Si_2Cl_6$), bis(t-butyl amino) silane, trisilylamine, disilylmethane, trisilylmethane, tetrasilylmethane, tetraethyl orthosilicate (TEOS) ($Si(OEt)_4$), disiloxanes, such as disiloxane ($SiH_3OSiH_3$), trisiloxane ($SiH_3OSiH_2OSiH_3$), tetrasiloxane ($SiH_3OSiH_2OSiH_2OSiH_3$), and cyclotrisiloxane (—$SiH_2OSiH_2OSiH_2O$—). Examples of tungsten-containing materials present in the effluent that may be abated using the methods disclosed herein include, for example, $W(CO)_6$, $WF_6$, $WCl_6$, or $WBr_6$. Examples of titanium-containing materials present in the effluent that may be abated using the methods disclosed herein include, for example, $TiCl_4$ and $TiBr_4$. Examples of aluminum-containing materials present in the effluent that may be abated using the methods disclosed herein include, for example, trimethyl aluminum.

One or more abating agents may be introduced in the effluent exiting the vacuum processing chamber into the effluent pre-treatment system 120 from the treatment reagent source 114. The treatment reagent source 114 may have an isolation valve 244 and a reagent mass flow controller (MFC) 242. The isolation valve 244 may be configured to quickly shut down the flow of reagents. The reagent MFC 242 may provide discrete amounts of constituent gases to combine as a reagent suitable for the effluent of the vacuum processing chamber 190. The amount of reagent flow provided by the reagent MFC 242 and the operation of the isolation valve 244 may be controlled by the controller 100, that also controls the operation of other components in the effluent pre-treatment system 120.

The regents introduced into the effluent pre-treatment system 120 from the treatment reagent source 114 may include, for example, $CH_4$, $H_2O$, $H_2$, $NF_3$, $SF_6$, $F_2$, HCl, HF, $Cl_2$, HBr, $H_2$, $H_2O$, $O_2$, $N_2$, $O_3$, CO, $CO_2$, $NH_3$, $N_2O$, $CH_4$, and combinations thereof. The abating agent may also include a combination of $CH_xF_y$, and $O_2$ and/or $H_2O$, and a combination of $CF_x$ and $O_2$ and/or $H_2O$. Different abating agent may be used for effluent having different compositions.

Additionally, a water distribution system (WDS) 250 may be introduced in the effluent exiting the vacuum processing chamber into the effluent pre-treatment system 120. The WDS 250 may have a WDS isolation valve 254 and a water mass flow controller (MFC) 252. The WDS isolation valve 254 may be configured to quickly open or shut the flow of water. The water MFC 252 may provide a controlled amount of water, or steam, to combine with the effluent of the vacuum processing chamber 190. The operation of the water MFC 252 and WDS isolation valve 254 may be controlled by the controller 100, that also controls the operation of other components in the effluent pre-treatment system 120.

The MFCs, such as MFCs 252, 242, control the flow of fluids into the effluent pre-treatment system 120 and may tailor flows to a predefined process recipe. The MFCs 252, 242 may operate in response to analogue or digital signals from the controller 100. The MFCs 252, 242 may have a response time between about 0.5 second to about 2 second to arrive at within 90% of setpoint, depending upon the specific models used. The MFCs 252, 242 may operate on a +/−15 VDC power supply.

The water and reagents are introduced into the effluent traveling through the foreline 192. A pressure sensor 248 may monitor the pressure in the foreline 192 to ensure the gas mixture pressure is within the limitations of the treatment process and equipment tolerances. The pressure regulating module 182 on the exhaust conduit 194 may have a sensor 285 for monitoring the pressure in the exhaust conduit 194 to ensure equipment safety and proper treatment of the effluent. The sensor 285 may be part of the pressure regulating module 182 and provide feedback for the operation of the pressure regulating module 182 to the controller 100. The controller 100 utilizes the information from the sensor 285 to control the operation of the pressure regulating module 182.

The flow of the gas mixture may be pulled by a vacuum pumping system 296 through the plasma reactor 210. The flow, shown by arrow 110, may split into two streams 110A and 110B in the plasma reactor 210 by a center portion 203 of the body 202 and then recombine to stream 110C when exiting the body 202 of the plasma reactor 210 at the second opening 222. The two streams 110A and 110B of the gas mixture may be dissociated by the plasma formed in the plasma reactor 210 prior to exiting as a less hazardous material through the second opening 222. The vacuum pumping system 296 may have a sensor 299 for monitoring the vacuum pumping system 296. The sensor 299 may provide information regarding the operation of the vacuum pumping system 296 to the systems controller, or by the controller 100 of the effluent pre-treatment system 120. In response to the information provided by the sensor 299, the controller (or controller 100) may control the operations of the vacuum pumping system 296.

The effluent pre-treatment system 120 may also contain an abatement system 298 disposed on the exhaust conduit 194 or the foreline 192. The abatement system 298 may further introduce chemicals, temperatures or other suitable processes to end, reduce, or lessen a hazard associated with the effluent. The abatement system 298 may have a sensor 299. The sensor 299 may have unidirectional or bidirectional communication and provide a state of the abatement system 298, i.e., an on or off state, or operation parameters to the abatement system 298 such as temperature or chemical flow information. The sensor 299 may be coupled to the controller 100, which utilizes the information to control the operation of other components in the effluent pre-treatment system 120.

The controller 100 includes a housing, such as a sheet metal housing, a Printed Circuit Board Assembly (PCBA), a display, a human interface such as a mouse, keyboard, touch screen, or other method for a user to interact with the controller 100. The controller 100 also has firmware for supporting all hardware connected thereto. The controller 100 may have non-volatile memory for storage of programmatic commands and data from the plurality of sensors interacting with the controller 100. The mass memory may additionally support data and error logging functions.

The controller 100 of the effluent pre-treatment system 120 may be connected to a power source 288, such as an alternating current (AC) generator or other suitable power source for providing electrical energy for operation of the controller 100. Alternately, the power source 288 may be direct current (DC) power supply such as a battery or fuel cells. The energy provided to the controller 100 by the power source 288 may be coupled with fuses and filtering to protect the controller 100. The power source 288 may provide energy to multiple controllers or other devices along with the energy supplied to controller 100. For example, the power source 288 may be a "universal input" switching power supply and provide about 50 Watts at 24 VDC output. A link 286 between the controller 100 and the power source 288 may be a smart link providing state information for the power source 288 and control of the power source 288 as well. The controller 100 may also have a backup power supply (not shown) provided at the controller 100 to provide adequate time for the controller 100 to respond to a power failure. The controller 100 has a high efficiency design for low power operation at about 4 watts aside from output drive requirements.

The controller 100 may have input and output (IO) ports 280 for communication and controlling at least the effluent pre-treatment system 120. The IO ports 280 may include analogue IO ports 282. In one example, the controller 100 may have at least 32 analog control outputs, operating at about 0-10 volts, to drive the MFCs 252, 242 or commands to the RF generator 230 through the generator sensor 234. Additionally, the controller 100 may have at least 8 analog control inputs, for example 8 analog control inputs, operating at about 0-10 volts, may sense flows at the sensors 248, 299 or the RF output from the RF antenna 236 measured at the RF sensor 235.

The IO ports 280 may additionally include digital IO ports 281. The controller 100 may have at least 24 digital control inputs (isolated), such as 56 digital control inputs; at least 8 digital programmable driver outputs, open collector; at least 8 program-defined digital control inputs (isolated); 1 or more Device Net (DNET) interface with one or more port connections and data link status indicators. The controller 100 may have 2 or more serial I/O ports for setup, monitoring or diagnostics, 8 or more LED indicators for providing the connection status of the MFCs, such as MFCs 252, 242.

The controller 100 may additionally have network interfaces such as Bluetooth, RJ11, RJ 45, 8011.x or other suitable means of communicating with external devices. The controller 100 may additionally have an interlock loop 284 for detecting and responding to undesired states in various devices controlled by the controller 100. The digital IO ports 218 may include digital network ports, among others, and operate over either a single dual channel. The analogue IO ports 282 may include interfaces for the command and pressure sensor signals.

The controller 100 may communicate with one or more of the pressure sensor 248 to monitor the pressure in the foreline 192; the pressure sensor 299 to monitor the pressure in the exhaust conduit 194, the temperature sensor 208 to monitor the temperature of the plasma reactor 210, or other sensors in the effluent pre-treatment system 120 to make decisions and determine system operations. For example, the controller 100 may determine a temperature is too high from the temperature sensor 208 and make adjustments to the plasma reactor 210 to protect system components therein. In a second example, the sensor 206 may signal an open state for the door 204 to the controller 100 and the controller 100 may send a command to the generator sensor 234 to cease power transmission from the RF generator 230 to the RF antenna 236 in order to prevent an injury to an operator or other person from the electrical hazard.

Figure 4:
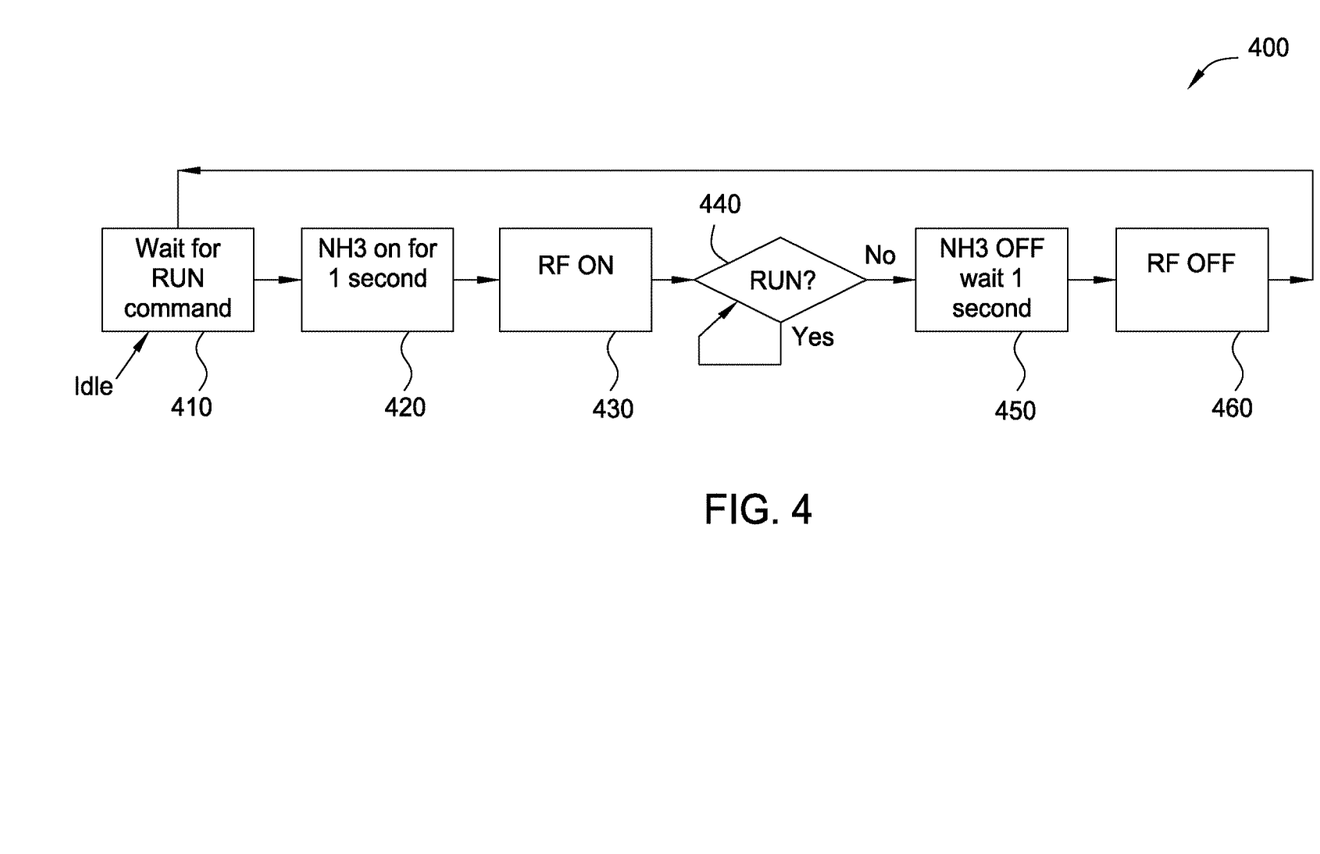
FIG. 4 is a flow diagram of a method for treating hazardous effluents produced by a semiconductor processing system.

The controller 100 is fully programmable to create a set of sequences for treating the effluent from the vacuum processing chamber 190. The program sequences may be formed for individual effluent recipes. The effluent recipes may correspond to one or more process recipes. Thus, each process recipes which exhaust a hazardous effluent gas may have a treatment recipe directed to the gases forming the hazardous effluent gas. The controller 100 may support sixteen (16) or more programming sequences to accommodate the various treatment recipes utilized for the hazardous effluent gases from the various process recipes. The programming sequences may be changed by means of a simple text editor, or a purpose-made sequence editor GUI. Each programming sequence may have up to 15 instructions sequences which form a recipe for treating the effluent. For example, the program sequences form a recipe in the controller 100 which may have functions for enabling gas flows (set point and enable); RF Power (set point and enable); loops, duration of events; fault trapping; interlock logging; and event logging among other functions. FIG. 4 shows an example sequence program 400 which may be utilized by the controller 100.

The sequence program 400 shown in FIG. 4 begins in an idle state at instruction sequence 410. The sequence program 400 waits for a run command and upon receiving a run command, moves to instruction sequence 420. At instruction sequence 420, $NH_3$ is flowed into the plasma reactor 210 for a predetermined period of time, for example about 1 second. At instruction sequence 430, the RF generator 230 provides energy to the RF antenna 236 for generating RF energy in the plasma reactor 210. At instruction sequence 440, a loop is executed, such as a do while loop. The sequence program 400 remains at instruction sequence 440 until the program receives an instruction to halt or continue onto instruction sequence 450. For example, the sequence program 400 may receive a fault which halts the sequence program 400 or the sequence program 400 may receive a stop or other instruction to move to instruction sequence 450. At instruction sequence 450, the $NH_3$ is turned off and there is a delay, for example of about 1 second, prior to moving to instruction sequence 460. At instruction sequence 460, the RF power is turned off and the sequence program 400 re-enters the idle state at instruction sequence 410. Additionally, if a limit is exceeded, such as a high temperature limit from the temperature sensor 208, anywhere during the sequence program 400, the sequence program 400 will execute the conditions specified in the instruction sequence 410, or other specified sequence, and halt to an idle state.

Within the control fields of each instruction sequence, many items can be specified as "limits" that cause the instruction sequence to be exited to the next instruction in the sequence. The majority of limit items can also be tagged as "faults" which will cause the instruction sequence to be halted and the controller fault state to be entered. Faults (and changes of state in general) may be indicated on the hardware interface by an LED or display. The indicator may display a running status and turn off at the fault and display a fault line to indicate an error has occurred.

In one example, if a fault is detected, the controller 100 may issue an alert. The alert may be an audible, visual, and/or electronic flag. For example, the controller 100 may issue an audible alert by generating an audible warning signal, such as a siren. In another example, the controller 100 may issue a visual alert by generating a visual warning signal, such as a strobe. In yet another example, the controller 100 may issue an electronic alert by generating an electronic signal, such as a text message, electronic mail or other digital communication signal.

Figure 3:
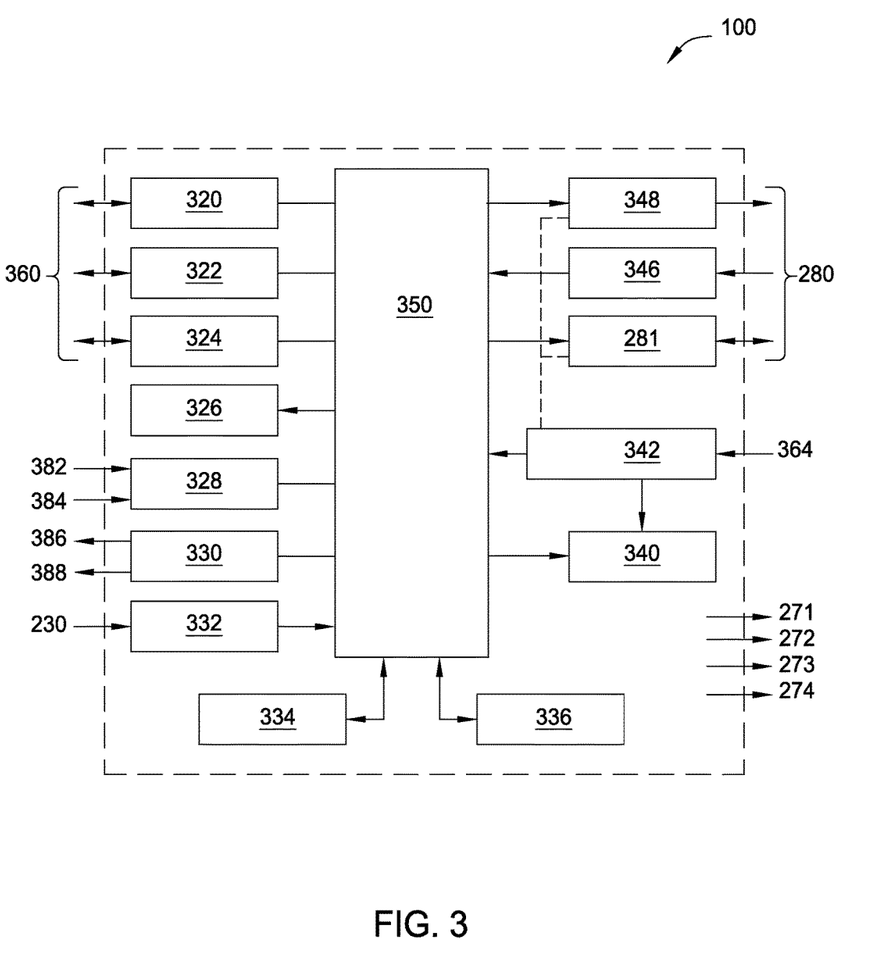
FIG. 3 is a block diagram of the controller of the effluent pre-treatment system.

FIG. 3 is a block diagram of the controller 100 according to one embodiment. The controller 100 may have a unique read-only ID serial number of 64 bits or optionally 128 bits and additionally an internal real time clock with power backup. The controller 100 has a microcontroller (MCU) 350 for running the programs and communicating with attached devices. The MCU 350 contains a processor core, memory, and programmable input/output peripherals. For example, the MCU 350 may have about 128 kb of flash memory, 4 kb of EEPROM and 4 kb of RAM. The MCU 350 may be programmed, erased, and reprogrammed. The MCU 350 may be attached to expansion non-volatile random-access memory (NVRAM), such as recipe memory 334 and log memory 336.

The recipe memory 334 may be about 32 kb NVRAM and store the sequence programs the MCU 350 executes for treating the effluent from the processing system. The recipe memory 334 stores recipes for treating the effluent as well as controller 100 setup information. The recipe memory 334 may be configured to store 16 or more named recipes in storage. Each recipe may contain a number of instructions, for example about 15 instructions, including a jump/loop-back (with counter) option for repeating instructions or sequences. The recipe may contain a recipe name (ASCII, up to 32 characters) and a recipe date stamp (when it was last uploaded or modified). Each of the 16 instructions within the recipe may contain output drive DO pattern (valve and RF enables and other control bits), output drive RF power or analog MFC flow command (4 channels*), DNET communications for DNET-capable MFCs (up to 63 devices), high and low tolerance limits for four analog return signals, disposition/option flags for excursions (example- abort, warn, log only), and a "next" step pointer for looping functions with count limit (if the count limit is 0, the sequence defaults to the next higher-numbered step). The individual counters and flags for each step to allow nested loops while duration increments for the instruction may be set at 0.1 second intervals.

The log memory 336 may be about a 128 kb NVRAM and store customizable information regarding the operation of the controller 100 and the treatment system. Multiple log entry returns or resets are from the specified starting point backwards in time by the number of returns requested. Each individual log entry may be 16 bytes in length. The log entries may be reset. Resetting the log entry may include all of the error log contents, counters and pointers and formats the storage areas that contain them. The log entries intervals and content may be customizable to conserve space in the log memory 336. In one embodiment, the material entering the logs may be modified, or filtered, to only record error handling and program sequence stops. The log memory may store recorded historical/cumulative data, for example such as one or more of: date in service (first process exposure); accumulated process time in hours (time actively running recipes); accumulated RF on time in hours; accumulated power-on time in hours; number of recipe cycles completed successfully for each recipe type; the number of recipe cycles aborted (some error or unexpected event occurred during the recipe) for each recipe type; and error counters including: RF errors, MFC errors, interlock errors, cycle aborts (from tool controller), over-temp errors, and pressure errors. Additionally, the log memory 336 may store error/event records which, for example, may include one or more of: time/date stamp, recipe and step numbers error codes indicating the type of error. For example, the log entry may have an "error code" of 0000 which may mean that the sequence stopped normally, as when all steps have been completed without failures. Items that exceed limits within the sequence step definitions will cause running sequence steps to exit or halt and an error code is stored in the log memory 336. Examples of controller error messages may include: Sequence ended normally; Sequence has started; Purge N2 flow fault; Purge CDA flow fault; WDS fault; Reagent 0 rate mismatch; Reagent 1 rate mismatch; Reagent 2 rate mismatch; Reagent 3 rate mismatch; RF generator power mismatch; RF generator internal fault; Vacuum overpressure; Foreline overpressure; Reagent 0 overpressure; Reagent 1 overpressure; Body over-temp limit; Insufficient cooling water flow; Main door open fault; Gas box cover open fault; Gas box exhaust fault; Sequence DI fault; or Sequence Al fault. However, it should be understood that the list is by no means exclusive and is shown for reference purposes only. Up to 1024 cumulative errors/events scan be logged, FIFO, in the log memory 336.

A display 326 may be attached to the controller 100. The display 326 may be a liquid crystal display (LCD), a light-emitting diode display (LED), or other display type. In one embodiment, the controller 100 has an LCD display 326. The LCD display 326 may provide an alpha-numeric display for status and information. The display 326 may have 4 lines of 20 characters or 4 lines of 40 characters depending on available space for the display 326. A GUI interface may be available on the display 326 for easy user programming of the controller 100. The controller 100 has the capability of naming and scaling devices and their data items for viewing on the display 326. For example, the RF generator 230 could be defined as: "RF gen 1" and its command output and feedback input scaled to display as "xxxxxW" rather than "0-100%".

Indicator LEDs 340 may be attached to the MCU 350 for providing status information. The indicator LEDs 340 may also interact with interlock logic 342. The interlock logic 342 may receive messages 364 from limit switches indicating a state or conditions in the treatment system. For example, the sensor 206 of the door 204 may send a message 364 to the interlock logic 342 indicating an open state for the door 204 and the indicator LED 340 for the switch may display notification of the open state. The indicator LEDs 340 may be provided for one or more of DC power on indicator, such as the generator sensor 234 being on; the cover interlock indicator, such as the sensor 206 indicating an open and/or closed state of the door 204; the over-temperature interlock indicator, such as temperature sensor 208, the pressure interlock indicator, such as pressure sensor 248; and a general health/fault indicator, among other indicators/sensors. The indicator LEDs 340 may provide a color indicator for the status or state of the item associated with the indicator. For example, the indicator LED 340 indicating the DC power may show a green color to signal the DC power is "OK" or a red color to signal a problem with the DC power. In a second example, the temperature sensor 208 may send a message 364 to the controller 100. The interlock logic 342 may determine from the message 364 an over-temperature condition exists and change the green color to red for the corresponding the indicator LED 340.

A power supply 332 provides power to at least the MCU 350. The power supply 332 may also provide power to the RF generator 230. Alternately, the RF generator 230 may be part of the power supply 332. The power supply 332 may provide about 85 VAC to about 265 VAC power at about 43 to about 63 Hz through a fused connector and switch to the controller 100. The controller 100 may transform the power to a direct current and provide several power options to connected devices. For example, the controller may provide a 24 VDC output 271, a 15 VDC output 272, a −15 VDC output 273, and a common leg 274 or ground. In this manner, active devices may be powered by the controller 100.

The controller 100 has the capability to automatically enter a low power, or "sleep" state when inactive for a period of time. At power-up or whenever an active program sequence ends (whether normal, aborted, or at errors) all analog outputs may revert to zero volts and the digital outputs revert to a state that is user-defined. However, after some period of user-defined inactivity, a different user-defined voltage for the digital outputs may be applied. The user may therefore define both short-term (idle) and long-term (inert) states as needed. This allows for maximum flexibility rather than simply turning everything off. If a program sequence is started before the controller 100 enters the inert state, execution of the sequence begins immediately from the idle state. If a program sequence is started when the controller is in the inert state, execution of the user defined voltage pattern is applied and the sequence begins immediately. It is the responsibility of the sequence programmer to allow for adequate wakeup time for hardware if required.

Serial command ports 360 are provided on the controller 100 to handle data transfers, program transfers and other serial commands to the MCU 350. The serial command ports 360 may include device net (DNET) ports 320 as well as one or more serial input/output ports (SIO) 322, 324. The DNET port 320 may be on a single DNET channel used to interconnect devices for data exchange on the controller 100. The single DNET channel may connect to a host system controller as well as the effluent pre-treatment system 120. One or more drops, i.e., wired connections, may contain other controllers, other MFCs, chamber controllers, robot controllers and so forth. Separate drops may be provided for the effluent pre-treatment system 120 and the host system with each having a unique address. Advantageously, the DNET network provides a robust interface for up to 63 devices while still having a small footprint on the controller 100.

The two SIO ports 322, 324 on the controller 100 may be electrically-isolated RS-232 ports, i.e., the ports 322, 324 are isolated and have no ground loops. The first SIO port 322, com 1, is mainly used as a command and general communications interface to and from a host system controller. The first SIO port 322 allows the host controller (or configuration programs) to access information contained inside the controller 100, and to program its functions including process sequence selection. The second serial SIO port 324, com 2, is primarily for service, i.e., updates, and data operations. The second serial SIO port 324 may be configured to provide streaming data during sequences (a setup option) and other data upon demand. In one embodiment, the data is streamed at speed of at least 57.6 K baud and may even be streamed higher than 230.4 K baud.

The I/O ports 280 are available on the controller 100 for device communication outside the DNET port 320. The I/O ports 280 may include channels for one or more of output drives, command inputs, interlock/safety sensor inputs (temperature, pressure, covers, RF generator status, etc.), MFCs (water and gas) and RF. The MFCs and RF generator connections may be connected using DSUB-9M pin connector ports (serial) on the I/O ports 280. Advantageously, the DSUB-9M have less expensive wiring requirements then conventional ports, are interchangeable, and easily assigned in the sequences for programming functionality into the controller 100 for operating the effluent pre-treatment system 120. Additionally, the I/O ports 280 may include connections using DA-15 (parallel) connectors which are optically isolated. In one embodiment, the RF generator ramps up or down within 0.1 second or so from the command input from MCU 350 over the I/O ports 280.

I/O ports 280, in one example, may have four total analog devices being controlled (MFCs, RF generators, mix and match) by the controller 100. Outbound communications to the MFCs may be on an analog output channel 348. Inbound communications to the MFCs may be on an analog input channel 346. Analog input channel 346 and analog output channel 348 are collectively shown as analog I/O ports 282 in FIG. 2. Additionally, the I/O ports 280 may include as many as 8 digital I/O ports 281. The digital I/O ports 281 may accept both outbound and inbound communication.

The MCU 350 may have isolated inputs 328 and isolated outputs 330. The isolated inputs 328 and the isolated outputs 330 may be electrically-isolated to prevent ground loop issues. The isolated outputs 330 may provide notification of an Error/Fault 386 or a Run/Stop 388 from the MCU 350. The isolated outputs 330 signal an override or execution of program sequence commands, such as halting the operation due to an error or fault. The isolated inputs 328 may include recipe selection 382 and run enable 384. A user may scroll through a recipe selection 382 and select the recipe appropriate for the effluent from the vacuum processing chamber 190. Upon selecting the appropriate recipe, the user selects run enable 384 to begin execution of the recipe on the MCU 350 of the controller 100.

The controller 100 has the capability for at least two means of sequence/recipe selections. These may be changed at any time, and by automated means. Therefore the wafer processing equipment (or other device) that utilizes the pre-treatment system 120 can select the stored sequence that is required "on the fly", and/or program new sequences at will. For example, a host control system may select between any of the stored recipes and initiate the chosen sequence by means of selector input lines, such as isolated inputs 328, or serial command port 360, including the DNET port 320.

Advantageously, the controller 100 operates using one of pre-stored program sequences (recipes), and in one example, includes up to sixteen pre-stored program sequences (recipes). Up to four mass flow controllers and up to two RF generators can be controlled by the controller 100 as well. Parallel, serial, and Device Net interfaces may be used for interfacing to the processing system controller or other "feed" device controller. Interlock and safety loops are implemented using hardware methods and monitored by the controller 100 as well. The controller 100 allows the effluent pre-treatment system 120 to starts if all the necessary interlocks and conditions for running are met. If an interlock, such as the sensor 206 of the door 204, or running condition, such as a temperature threshold determined by the temperature sensor 208, changes, the controller 100 stops any currently running program sequence regardless of the sequence number specified in the command and returns to a safe idle state, i.e., the RF generator and reagent gasses are turned off. The inputs for interlocks and running conditions must be satisfied for the program sequences to restart. The controller 100 logs the operation thereof as well as faults and errors for safety purposes, operational tweaking, and maintenance of the entire system.

While the foregoing is directed to embodiments of the present invention, other and further embodiments of the invention may be devised without departing from the basic scope thereof, and the scope thereof is determined by the claims that follow.

What is claimed is:

1. An effluent pre-treatment system, comprising:
 a plasma reactor comprising:
  a body having a first opening configured to receive effluent from a plasma processing chamber and a second opening from which effluent exits the plasma reactor to an exhaust conduit;
  a center portion formed through the body wherein effluent entering the first opening splits into separately distinct and isolated first and second flows, wherein the first and second flows go around the center portion before recombining at the second opening; and
  an RF antenna disposed in the body suitable to generating RF energy inside the body; and
 a controller electronically coupled to the plasma reactor comprising:
  a MCU for processing a program;
  a plurality of I/O ports configured to communicate with the MCU;
  an interlock logic in communication with the MCU, wherein the interlock logic provides a run state for the MCU;
  memory, where the memory comprises:
   recipe memory storing a plurality of programs configured to operate the plasma reactor; and
   log memory; and
  wherein the MCU is configured to execute a selected program of the plurality of programs operating the plasma reactor for treating the effluent upon the interlock logic providing the run state.

2. The effluent pre-treatment system of claim 1, wherein at least one of the plurality of I/O ports is coupled to an RF sensor disposed in the body of the plasma reactor.

3. The effluent pre-treatment system of claim 2, wherein the plurality of I/O ports are coupled to a plurality of sensors configured to monitor proximity, pressure, heat, energy, and state information of the effluent pre-treatment system, and wherein the controller is configured to manage a flow of gas and water into the plasma reactor in response to information provided by at least one of the sensors.

4. The effluent pre-treatment system of claim 1, wherein the I/O ports may be individually electrically isolated from each other.

5. The effluent pre-treatment system of claim 1, wherein the MCU is configured to record error handling and program sequence stops in the log memory.

6. The effluent pre-treatment system of claim 1, wherein the recipe memory is configured to store up to sixteen programs.

7. The effluent pre-treatment system of claim 1, wherein the MCU is configured to generate an alert upon a fault.

8. The effluent pre-treatment system of claim 1, wherein the programs have a plurality of instructions sequences, the instruction sequences may include:
   determining if necessary interlocks and conditions for running the selected program are met; and
   if the necessary interlocks and conditions for running the selected program are met, treating effluent from the plasma processing chamber using the selected program.

9. The effluent pre-treatment system of claim 1, wherein the plurality of I/O ports comprises:
   at least 32 analog control inputs and outputs; and
   at least 56 digital control inputs and at least 8 digital outputs.

10. The effluent pre-treatment system of claim 9, wherein the analog control inputs operate at about 0-10 volts.

11. The effluent pre-treatment system of claim 1, further comprising:
   an abatement system fluidly coupled by the exhaust conduit to the plasma reactor; and
   a vacuum pump disposed between the plasma reactor and the abatement system.

12. A method for treating effluent from a plasma processing chamber with a controller, the method comprising:
   determining if necessary interlocks and conditions for running a program are met; and
   if the necessary interlocks and conditions for running the program are met, treating effluent from the plasma processing chamber, wherein treating the effluent comprises:
   splitting the effluent into separately distinct and isolated first and second flows in a plasma reactor interfaced with an exhaust port of the plasma processing chamber and using the program for a plasma source in the plasma reactor.

13. The method of claim 12, wherein the program is selected from one of 16 pre-stored programs stored in a memory of the controller.

14. The method of claim 12, wherein the program is selected automatically by a host controller.

15. The method of claim 14, wherein the program selectively operates mass flow controllers providing treatment gases and water to the plasma reactor and provides instructions for controlling RF energy provided to the plasma reactor.

16. The method of claim 12, further comprising:
   providing treatment gas to the effluent;
   maintaining a temperature and a pressure in the plasma source; and
   applying RF energy to the treatment gas and effluent in the plasma reactor.

17. The method of claim 16, wherein the program provides instructions in response to feedback from up to four mass flow controllers and up to two RF generators, wherein the two RF generators are disposed in the plasma reactor.

18. The method of claim 16 further comprising:
   stopping treatment of the effluent in response both the interlock and safety loops are being in a pre-defined error state.

19. The method of claim 18, further comprising:
   logging an error code in a memory of the controller.

20. The method of claim 16, further comprising:
   issuing an electronic alert in response to being in a pre-defined state.

\* \* \* \* \*